United States Patent [19]

Tuoriniemi et al.

[11] Patent Number: 5,978,689
[45] Date of Patent: Nov. 2, 1999

[54] PERSONAL PORTABLE COMMUNICATION AND AUDIO SYSTEM

[76] Inventors: Veijo M. Tuoriniemi, 50 Horatio St., #50, New York, N.Y. 10014-1675; Joseph Michael Allison, 2070 Miami Rd., Euclid, Ohio 44117

[21] Appl. No.: 08/920,406

[22] Filed: Aug. 29, 1997

Related U.S. Application Data

[60] Provisional application No. 60/052,003, Jul. 9, 1997.

[51] Int. Cl.⁶ .................................................. H04Q 7/32
[52] U.S. Cl. ............................ 455/569; 455/90; 455/351
[58] Field of Search ............................. 381/12, 183, 187, 381/311, 26, 74, 300, 334, 91; 379/430, 433, 79, 428, 434; 455/89, 66, 90, 351, 569, 575, 550, 556, 557

[56] References Cited

U.S. PATENT DOCUMENTS

| | | |
|---|---|---|
| 4,484,029 | 11/1984 | Kenney . |
| 4,591,661 | 5/1986 | Benedetto et al. . |
| 4,993,061 | 2/1991 | Hsieh . |
| 5,210,796 | 5/1993 | Hirabayashi et al. ..................... 381/12 |
| 5,243,640 | 9/1993 | Hadley et al. ............................. 379/59 |
| 5,247,705 | 9/1993 | Attig et al. . |
| 5,475,872 | 12/1995 | Sato . |
| 5,497,339 | 3/1996 | Bernard . |
| 5,497,373 | 3/1996 | Hulen et al. . |
| 5,504,812 | 4/1996 | Vangarde ................................ 379/430 |
| 5,535,432 | 7/1996 | Dent . |
| 5,542,103 | 7/1996 | Mottier et al. . |
| 5,551,065 | 8/1996 | Honore . |
| 5,594,658 | 1/1997 | Lemaire et al. ......................... 364/514 |
| 5,596,638 | 1/1997 | Paterson et al. . |
| 5,694,467 | 12/1997 | Young, III . |

OTHER PUBLICATIONS (Anonymous), "Nokia Communicator Available from Talkland," published by Talkland Co., U.K., at Internet Site http://www.talkland.co.uk/nl.htm, Nov. 25, 1996, 2 pages.

Dambacher, "Digital Broadcasting," The Institution of Electrical Engineers: London, United Kingdom, (1996), pp. v–vii and 1–137.

Jabbari (editor) et al., "Multiaccess, Mobility and Teletraffic for Personal Communications," Kluwer Academic Publishers: Boston (1996), pp. 211–215.

Prasad, "CDMA for Wireless Personal Communications," Artech House, Incorporated: Boston (1996), pp. 1–13, 34–37, 110–113 and 352–357.

*Primary Examiner*—Dwayne D. Bost
*Assistant Examiner*—Jean A. Gelin
*Attorney, Agent, or Firm*—Charles E. Bruzga

[57] ABSTRACT

A portable communication and audio system includes a radio telephone for receiving a first audio signal and transmitting a corresponding first radio signal through a transmitter to another location, and for receiving a second radio signal through a receiver and converting it to a second audio signal. An audio device provides a third audio signal. A microphone receives the first audio signal. A headset with first and second speakers is provided for selectively listening to the second or the third audio signal. A user-operated switch selectively disables the first speaker in a first state or the microphone in a second state. A state-indicating apparatus produces a signal indicating the state of the user-operated switch. A control apparatus, responsive to the state-indicating apparatus, enables telephone usage by connecting the microphone to the transmitter and connecting the second speaker to the receiver when the user-operated switch is in the first state, and connects the first and second speakers to receive the third audio signal when the user-operated switch is in the second state. The system preferably includes a pivotable boom depending from the headset, with the microphone being located on the boom. The audio device can be separate from the radio telephone. The system preferably includes a momentary, user-controlled switch and control apparatus for implementing a control function for a selected one of the radio telephone and the audio device.

85 Claims, 10 Drawing Sheets

PERSONAL PORTABLE COMMUNICATION AND AUDIO SYSTEM

This application claims priority from provisional application Ser. No. 60/052003 filed on Jul. 9, 1997.

FIELD OF INVENTION

This invention relates to digital cellular telephones, especially to a digital cellular telephone combined with a digital audio device having external speakers and a microphone.

BACKGROUND OF THE INVENTION

Previously portable or mobile telephone and communication units have been developed to perform several different tasks such as voice mail, facsimile mail, electronic mail, interactive voice response, automated audio text services, automated attenuated surface services electronic messaging services, radio paging services, speech recognition/speech synthesis, TDMF tone detection, voice recognition, interface of voice and data between public switched telephone network PSTN, the packet switched public data network, and portable telephone telephones. (For example, see U.S. Pat. No. 5,497,373.)

However, all of these units lack the capability to listen to public audio broadcast programs or stored digital audio programs from a compact disc player or cassette player while being able to simultaneously be alerted to incoming messages.

Many manufacturers sell headsets for portable cellular telephones on the market. Also different light-weight digital audio devices are available However there is no system available where a digital cellular telephone and a digital audio device are combined to work integrally together.

U.S. Pat. No. 5,551,065 describes a solar-powered audio-entertainment device comprising a solar-powered cassette player, radio receiver or CD player in wireless connection with a headset. Such invention does not comprise a telephone and is not connected for wireless telecommunication.

A portable cordless telephone transceiver-RF-receiver is disclosed in U.S. Pat. No. 4,591,661. Such invention is a cordless telephone transceiver having a broadcast RF receiver. Use of this type of unit is restricted to a very limited area. It does not allow the listener free mobility because it is dependent on one RF transceiver and its area coverage is usually equal to one apartment.

U.S. Pat. No. 4,993,061 discloses a similar type cordless telephone as described in U.S. Pat. No. 4,591,661 except having a cassette player instead of a radio receiver. Both of these previous devices lack the complete portability which is typical for cellular telephone.

In U.S. Pat. Nos. 5,497,338 and 5,497,373, two personal communicators are disclosed. Personal communicators are capable to of sending and receiving faxes, e-mail and information either through a telephone line or via cellular network and to show messages on a display panel. These patents do not disclose an audio device or a headset.

A broadcast receiver and mobile telephone for motor vehicles is disclosed in U.S. Pat. No. 5,247,705. This invention is restricted to a vehicle environment and does not have a headset. It is designed to be installed to a vehicle permanently and it cannot be used outside of the vehicle.

A headset for use with a radiotelephone is described in U.S. Pat. No. 5,504,812. This headset can be used to carry on a phone conversation through an external speaker and microphone located in a headset. Such headset cannot be used to listen to an audio program while having the telephone in a stand-by mode. Also, the headset circuitry cannot produce an output tone when a push button is pressed, because the switch is connected in the ground return where it disconnects the earphone. The very best that this approach can do is to output a tone when the push button is released, not when it is pushed, which would be awkward. Every push-button telephone gives tones when the number keys are pressed, not when it is released. Without the beep each time the button is pushed, the user may loose track of the number of pushes or be uncertain as to whether or not the button was pushed far enough.

A headset for hands-free wireless telephone is disclosed in U.S. Pat. No. 5,596.638. Such invention is meant to be used only with a mobile telephone and cannot be used to switch operation between a telephone and an audio device.

SUMMARY OF THE INVENTION

Accordingly, several objects and advantages of different embodiments and variations of the invention are:

The capability to listen an audio program while being able to receive telephone calls at the same time virtually anywhere. The invention is not dependent upon any one RF base station. A cellular telephone allows a user to move in a wide area.

The invention gives a user a hands-free alternative to listen to an audio program and to initiate phone calls without taking the headset.

The headset of this invention gives the user more options than conventional headsets with microphone. Conventional headsets can only be used to operate with a cellular telephone.

The headset of this invention gives user the option to choose between an audio program and a telephone conversation. In advanced embodiments, it is also possible to receive synthesized pager messages and E-mail through common speakers.

Other objects and advantages are:

Sharing a common headset allows the user to receive telephone ring alert signals discreetly through the speakers when a telephone ring alert sound is undesirable, such as in a public space.

The invention is also useful in noisy environments where the noise usually prevents user from hearing normal-level telephone audio ring signals from a pocket or bag where the telephone is usually held.

By the audio device and telephone sharing a common housing it makes it possible to have one light-weight compact device which is easier and lighter to carry than two individual devices separately. It is also easier to operate than two separate devices, since change of operation between audio listening and telephone usually needs only a turn of one switch without taking the headset off.

This combined system will also be simpler and cheaper to manufacture than an audio device and telephone separately, since duplicate parts can be avoided. Telephone and audio devices may share the housing, speakers and the power source.

Since digital cellular telephone signals are commonly encrypted, this invention gives a user security. Phone calls cannot be heard by other parties by radio receivers such as if using ordinary RF transceivers.

In further embodiments digital communication makes it possible to add other services to this invention. In common applications e-mail and pager messages may be routed and show on a display.

One possible feature is receiving E-mail and radiotext through a synthesizer which translates alphanumeric information in to an audible message. The synthesizer can be located in the system or can be provided by the telephone network service.

In further embodiments there is a possibility to use a voice activating feature to dial numbers and give a plurality of partial operational commands to the audio and telephone units.

In broadcasting, digital technology requires less power. Employing digital technology saves energy and is more environmentally friendly than a conventional analog system. Lower power consumption also makes it possible to have a longer operational time which is important for portable radios and telephones.

An exemplary embodiment of the invention provides a portable communication and audio system. The system includes a radio telephone for receiving a first audio signal and transmitting a corresponding first radio signal through a transmitter to another location, and for receiving a second radio signal through a receiver and converting it to a second audio signal. An audio device provides a third audio signal. A microphone receives the first audio signal. A headset with first and second speakers is provided for selectively listening to the second or the third audio signal. A user-operated switch selectively disables the first speaker in a first state or the microphone in a second state. A state-indicating means produces a signal indicating the state of the user-operated switch. A control means, responsive to the state-indicating means, enables telephone usage by connecting the microphone to the transmitter and connecting the second speaker to the receiver when the user-operated switch is in the first state, and connects the first and second speakers to receive the third audio signal when the user-operated switch is in the second state. The system preferably includes a pivotable boom depending from the headset, with the microphone being located on the boom. The audio device can be separate from the radio telephone. The system preferably includes a momentary, user-controlled switch and control means for implementing a control function for a selected one of the radio telephone and the audio device.

BRIEF DESCRIPTION OF THE DRAWINGS

In the drawings, in which like reference numerals refer to like parts.

DETAILED DESCRIPTION OF THE INVENTION

FIRST EMBODIMENT

Figure 1:
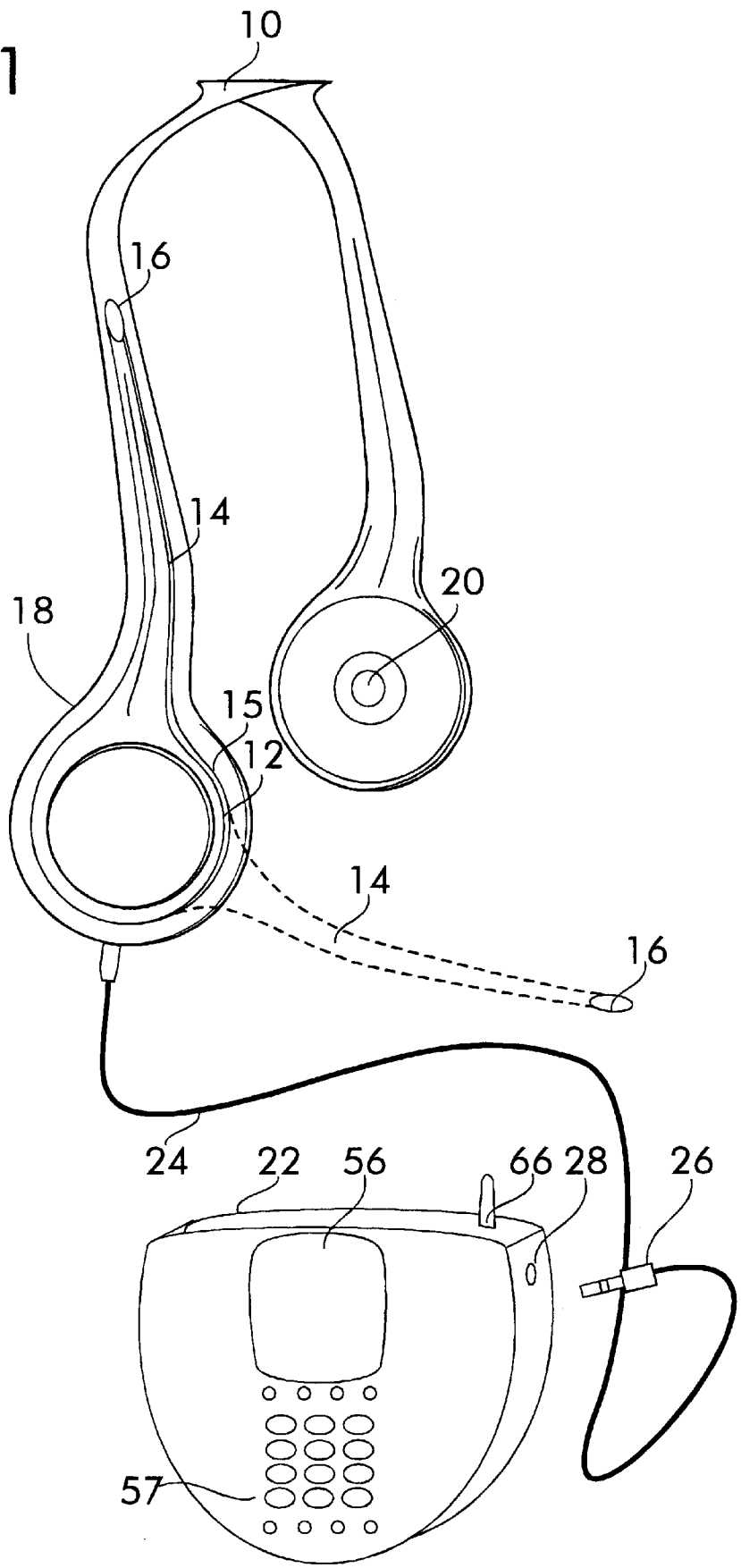
FIG. 1 shows a perspective view of the first embodiment of the personal portable communication and audio system.

FIG. 1 shows a perspective view of a personal communication and audio set. The housing of a headset 10 has a boom 14. In the far end of the boom 14, there is a microphone 16, which is preferably of the carbon button type. However, microphone 16 could alternatively comprise, e.g., other types of microphones using a preamplifier (not shown) so as to emulate a carbon button microphone. DC power for such a preamplifier can be supplied from a telephone line (not shown) by passing the signal on the line through a low pass filter. In the near ear end of the boom 14, a user-manipulated switch 12 is connected to pivot 15. Speaker 18 is connected on the other side to the housing 10 near a user's ear. The other speaker 20 is located respectively on the other side of the housing. The headset 10 is connected to a main housing 22 of the communication audio sets by a cord 24 having a connector 26 in the end. The connector 26 mates with a jack 28 of the main housing 22.

Figure 2:
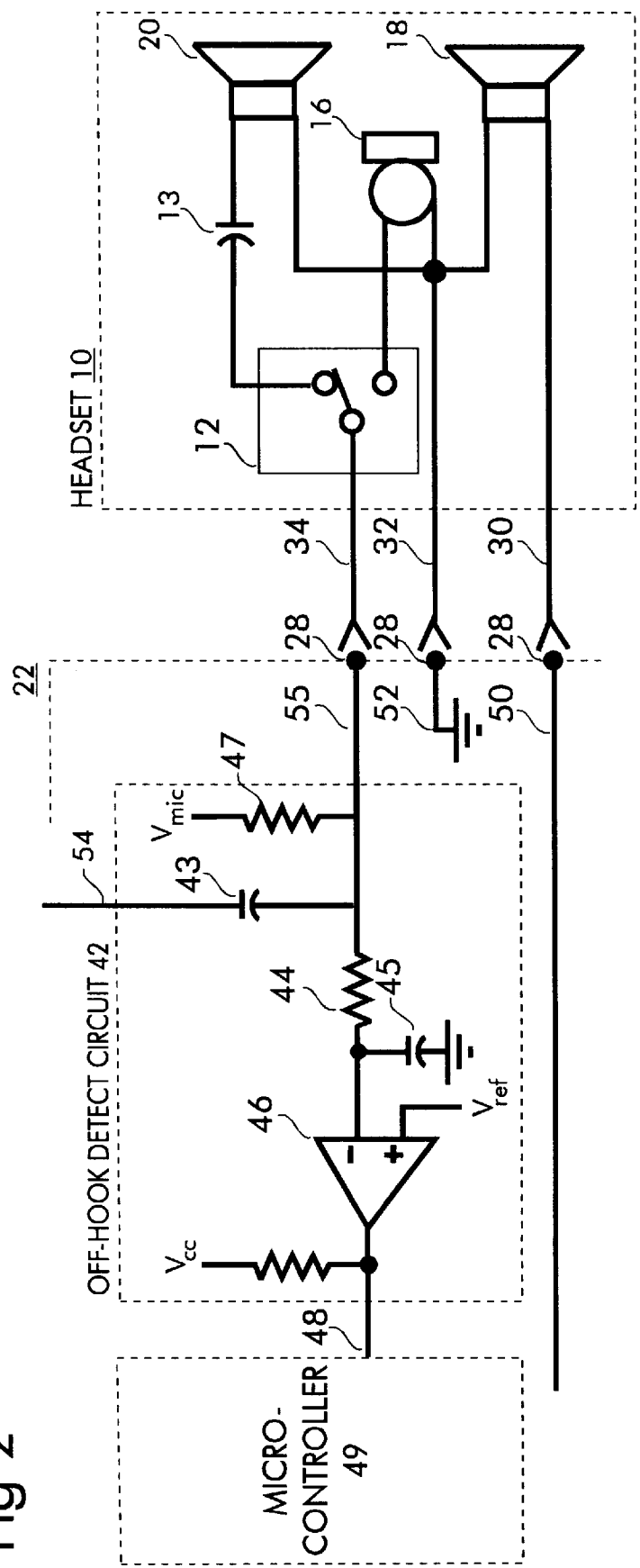
FIG. 2 shows a circuit diagram of the headset and the off-hook detect circuit of the first embodiment.

FIG. 2 shows a circuit diagram of the headset and an off-hook detect circuit. The jack 28 has three connections to three conductors to the audio telephone set 22. A first conductor 30 connects the speaker 18 to a conductor 50. A conductor 32 is connected to the ground of the telephone audio set. The other end of the ground line conductor 32 leads to the speaker 18 and the speaker 20 and the microphone 16. A conductor 34 is connected to a conductor 55 leading to an off-hook detect circuit 42.

The headset end of the conductor 34 is connected to the user-manipulated switch 12. This two-position switch 12 selectively connects the conductor 34 either to the second speaker 20 or to the microphone 16. Between the switch 12 and the speaker 20 there is a capacitor 13. The capacitor 13 blocks the DC voltage applied by the off-hook detect circuit 42 while, at the same time, passes the audio signal. It is preferred that the size of the capacitor 13 be such that its reactive impedance is small relative to the impedance of the speaker 20 at the lowest frequency to be heard. An exemplary minimum value of 100 mF, 10 V DC. is recommended for the capacitor 13 as well as for the capacitor 43.

The microphone 16 and the speaker 20 share the same conductor 34 of the cord 24. Sharing the same conductor 34 makes it possible to use a standard three-line cord between headset 10 and the main housing 22 and at the same time have switch 12 mounted to the headset 10 where it is easily available. The conductors 30 and 34 are used to forward stereophonic audio signals to the speakers 18 and 20 respectively. Telephone calls can be initiated by switching the switch 12 to the microphone 16. In this case the conductor 30 carries a received telephone audio signal and conductor 34 is used to carry telephone audio speech signal from the microphone 16 to a transmitter 58.

The voltage Vmic provides a source of voltage and a resistor 47 converts the voltage Vmic into a current used by the carbon button microphone 16. Capacitors 43, 45 and the capacitor 13 of the headset block the DC component of current flowing in the resistor 47 so that the DC component of voltage at the line 55 is determined exclusively by the resistive value of the resistor 47 and the DC resistance of the microphone when the switch 12 of the headset is connected to the microphone 16. When the switch 12 is connected to the speaker 20 the DC voltage at the line 55 is equal to Vmic since there is then no DC path to ground at the line 55.

When the user connects the switch 12 to the microphone 16 position, the DC path to ground completed by the carbon button microphone 16 causes the DC component of voltage at the line 55 to drop due to the voltage-divider action between the resistor 47 and the resistance of the microphone 16.

A change in the DC component of the voltage at line 55 is detected directly by the comparator 46 and this voltage change is due to a DC current change in line 55 which in turns is due to an impedance-to-ground change at line 55. Such impedance change is due to the microphone 16, or in some cases to a pre-amplifier (not shown) being connected versus disconnected.

This drop in voltage is detected by a comparator 46 to produce a step change in the voltage at a line 48. The RC combination of a resistor 44 and the capacitor 45 form a low pass filter that prevents the comparator 46 from responding to audio signal voltage at the lines 54 and 55. The comparator 46 then changes state only in response to the DC component of voltage at the line 55 so the changing of the switch 12 is the only action resulting in the change in output at the line 48. There is therefore a one-to-one correspondence between the position of the switch and the state of the output at the line 48. That correspondence is as follows: when the switch is in the speaker 20 position line 48 is low; when the switch is in the microphone 20 position, line 48 is high.

As can be appreciated from the foregoing description, capacitor 13 is a frequency-dependent impedance coupled to the speaker 20 so as to allow the coupled (e.g., serial) combination of capacitor and speaker to have a discernibly different impedance from microphone 16 at zero frequency (i.e. DC). As will be apparent to those of ordinary skill in the art, other forms of a frequency-dependent impedance coupled to speaker 20 can be used to make the coupled combination of impedance and speaker have a discernibly different impedance at a predetermined frequency from microphone 16.

Figure 3:
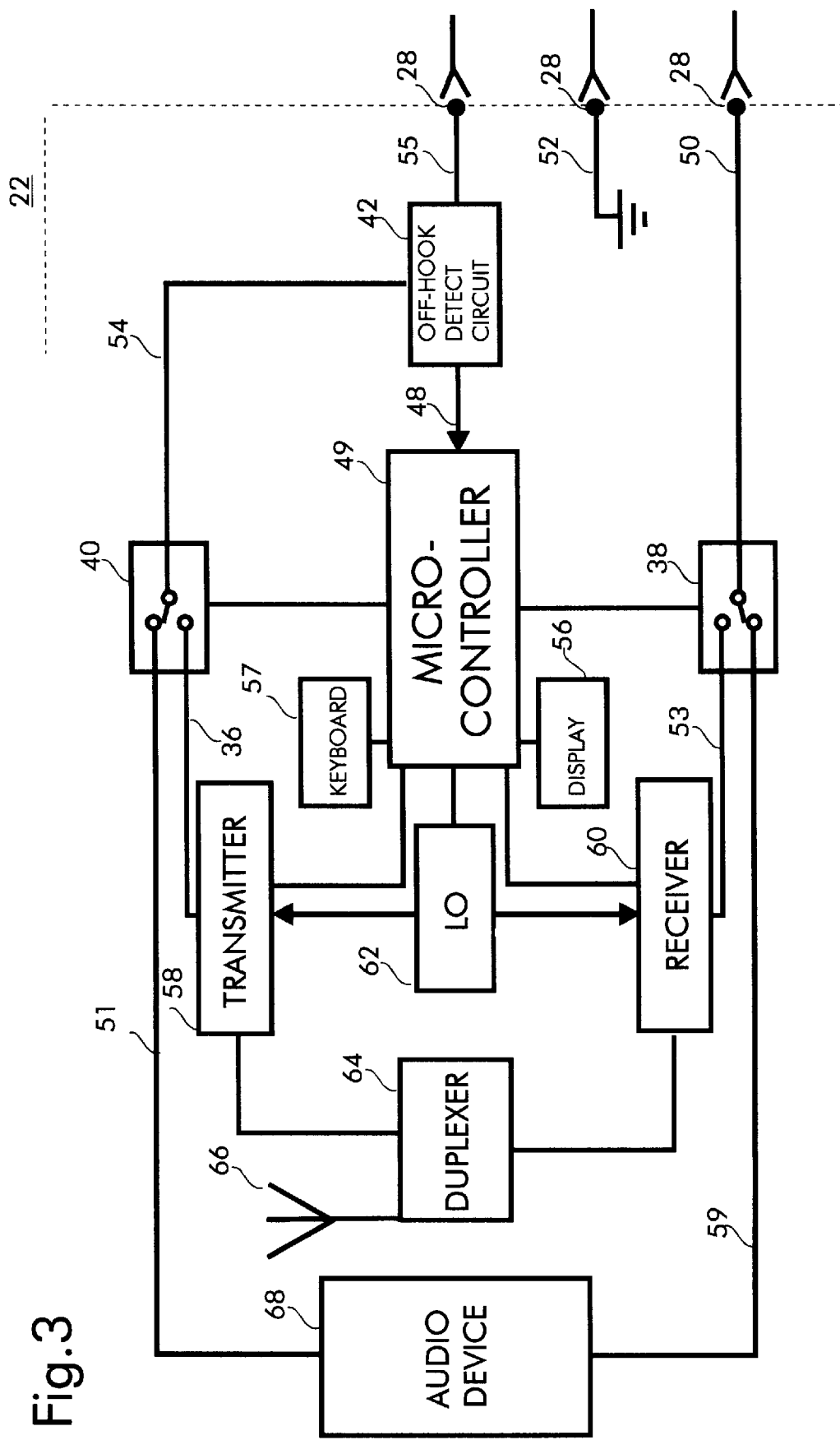
FIG. 3 shows a block diagram of the first embodiment.

FIG. 3 shows a block diagram of the main embodiment of the telephone audio set 22. An off-hook detect circuit 42 senses a voltage or current change on line 55 when the user manipulative switch 12 is turned either to the speaker 20 or to the microphone 16. The off-hook detect circuit is connected to microcontroller 49 through the conductor 48.

A microcontroller 49 having a microprocessor along with stored program memory, controls the telephone and the audio unit 22. The microcontroller 49 is connected to a keyboard 57 and a display 56, a transmitter 58, a receiver 60, a local oscillator 62 a controllable switch 38 and a controllable switch 40. The transmitter 58 and the receiver 60 are connected to a duplexer 64 having an antenna 66. Duplexer 64 can be eliminated if the radio telephone operates in a time-division duplex system. The controllable switch 40 is connected to audio device 68 by conductor 51 and to the transmitter through conductor 36. The controllable switch 38 is connected to receiver 60 through a conductor 53 and the output of the audio devices through conductor 54.

While a user listens to the audio device 68 and with the telephone in a stand-by mode, incoming call alerts are routed to the speaker 18 through the conductor 50. This makes it possible for user to listen the audio device 68 while being able to get incoming telephone audio alert signals simultaneously.

When an incoming call alert is heard, the user can take the phone call by connecting the user-manipulated switch 12 to the microphone 16. The off-hook detect circuit 42 senses the change in voltage or current and sends a message to the microcontroller 49. The microcontroller 49 either squelches the audio device 68 or turns power of the audio device 68 off and connects the controllable switch 38 to receive telephone speech from the receiver 60, and the controllable switch 40 to forward audio speech from the microphone 16 to the transmitter 58.

When the user-manipulated switch 12 is connected to the microphone 16, the off-hook detect circuit 42 senses such condition and sends an off-hook-signal to the microcontroller 49. When the microcontroller 49 receives such off-hook signal, it switches controllable switch 38 to catch the telephone audio speech signal from receiver 60 through a conductor 53 and sends it to the speaker 18 through the conductor 50. When the off-hook signal is received from the off-hook detecting circuit 42, the microcontroller 49 also switches the controllable switch 40 to send telephone audio speech received from the microphone 16 to the transmitter 58 through a conductor 36.

The off-hook detect circuit 42 senses when the user-manipulated switch 12 is connected to the speaker 20 (FIG. 2) and sends an on-hook signal to the microcontroller 49. When an on-hook signal is received from the off-hook detect circuit 42, the microcontroller 49 connects the controllable switch 40 to receive first channel audio signal from the audio device 68 and forwards such signal to the speaker 20 through the conductors 54 and 55. Simultaneously, the microcontroller 49 also connects the controllable switch 38 to receive second channel audio signal from the audio device 68 and forwards such signal to the speaker 18 through the conductor 50.

As an alternative to the off-hook detect circuit 42, a manually operated switch (not shown) could be used to indicate the state of the user-manipulated switch 12.

OPERATION OF THE FIRST EMBODIMENT

This combined system of digital cellular telephone and audio device gives a user a hands-free option and virtually ultimate mobility to listen to an audio program while being able to hear telephone audio ring signals and initiate telephone calls through a common headset. A user can choose between three different options. He/she can also listen to an audio program from audio device 68 and have telephone on stand-by mode. The stand-by mode is the idle mode of the radio telephone during which the radio telephone is neither receiving or transmitting calls. During this time, the radiotelephone may be registering with the base station of the cell in which it is located or simply checking for incoming calls. A user can also choose to turn the audio device off and have the telephone on stand-by mode. As third alternative he/she can either listen to audio device while having the telephone device off.

When an incoming telephone call alert is heard, a user can answer the phone call by turning the user-manipulated switch 12 to microphone position. Switch 12 is connected to the boom 14. When the user turns the boom 14 in front of the mouth ("mouth position"), the switch 12 turns to the microphone position. The off-hook detector 42 senses voltage or current change on the line 55 and changes the output on line 48. The microcontroller 49 senses the change on line 48 and turns the controllable switch 38 to receive telephone audio speech from the receiver 60 and routes it to the speaker 18. The microcontroller 49 also turns the controllable switch 40 to connect the microphone 16 to the transmitter 58.

When a telephone ring alert is received and the call is answered an off-hook message is received by the microcontroller 49. If audio device 68 is active when the call is answered, the microcontroller 49 either mutes the audio signals from the audio device 68 or turns the power of the audio device 68 off. Turning the power off saves energy and gives the radio telephone more power to complete the transceiving operation.

A user terminates a telephone call by turning the user-manipulated switch 12 to be connected to the speaker 20. The off-hook detector 42 senses voltage or current change on the line 55 and sends information to the microcontroller 49. The microcontroller 49 turns the controllable switch 38 to receive second audio channel signal and the controllable switch 40 to receive first audio channel signal and routes the signals to speakers 18 and 20 respectively. If audio device 68 was active while an incoming telephone call was answered, terminating the phone call returns the audio device 68 to an active state. Microcontroller 49 turns the audio device on or reinstates the audio signal from the audio device 68.

The digital cellular telephone and the audio device share same housing and power unit. It is possible to switch the power of the telephone or the audio unit off and use either of the devices individually. This operational feature saves power and allows longer operating time.

Figure 4:
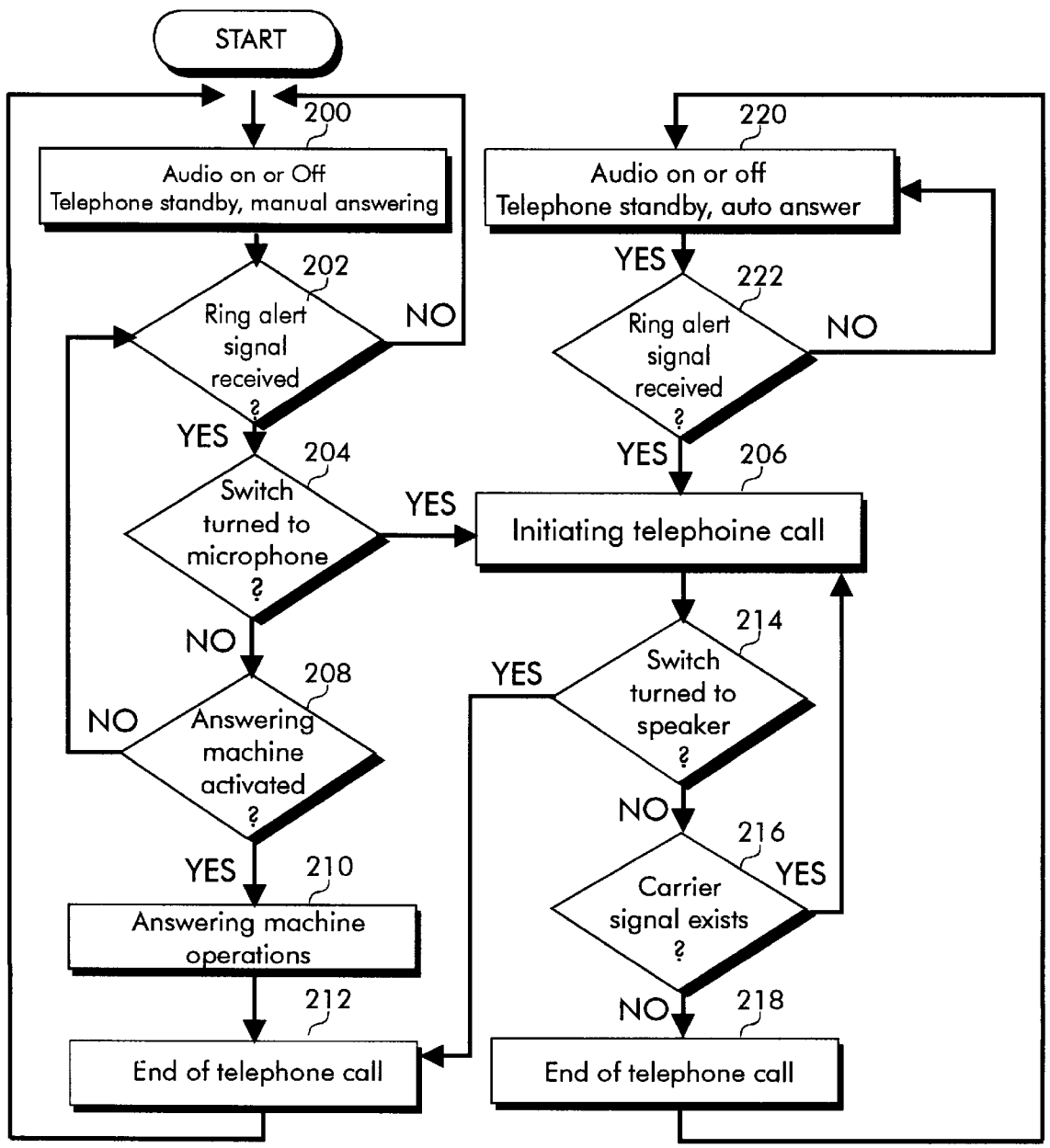
FIG. 4 shows a flow diagram of initiation and termination of telephone calls.

FIG. 4 shows a flow diagram of initiation and termination of telephone calls. The process begins from stand-by mode 200. During stand-by mode telephone is registering with the base stations of the cells or checking for incoming calls. A user has an option to listen to an audio program through the speakers 18 and 20 if desired. When ring alert signal is received 202 user can turn the switch 12 by turning the boom 14 in front of the mouth position and initiate the phone call 206. Alternatively, a user can forward the call to an answering machine 208. After predetermined quantity of ring alerts the answering machine operations go on 210 and ends a telephone call 212. Ending of a call returns the process to original stand-by mode 200. Answering machine can be a part of the system or it can be provided by the telephone network service provider.

In case a user had decided to initiate phone call 206, in the end of call, he/she can terminate the call by turning the boom in speaker 20 position 214. This ends the phone call 212 and returns to stand-by mode 200. If user wants to change mode to auto answer mode he/she can keep the boom down in front of the mouth position, connected to the microphone 16. In this mode user can listen to an audio program through one speaker if desired. When ring alert signal is received the microcontroller 49 automatically squelches or mutes the audio signal and turns telephone operations on. User is able to initiate telephone call immediately. When telephone audio signal 216 does not exist anymore, the microcontroller 49 automatically returns operation back to telephone stand-by auto answer mode 220. Whenever user wants to change to manual answer mode 200, which re-enables listening of audio program through both speakers 18 and 20 he/she simply turns the boom to its upward position.

SECOND EMBODIMENT

Figure 5:
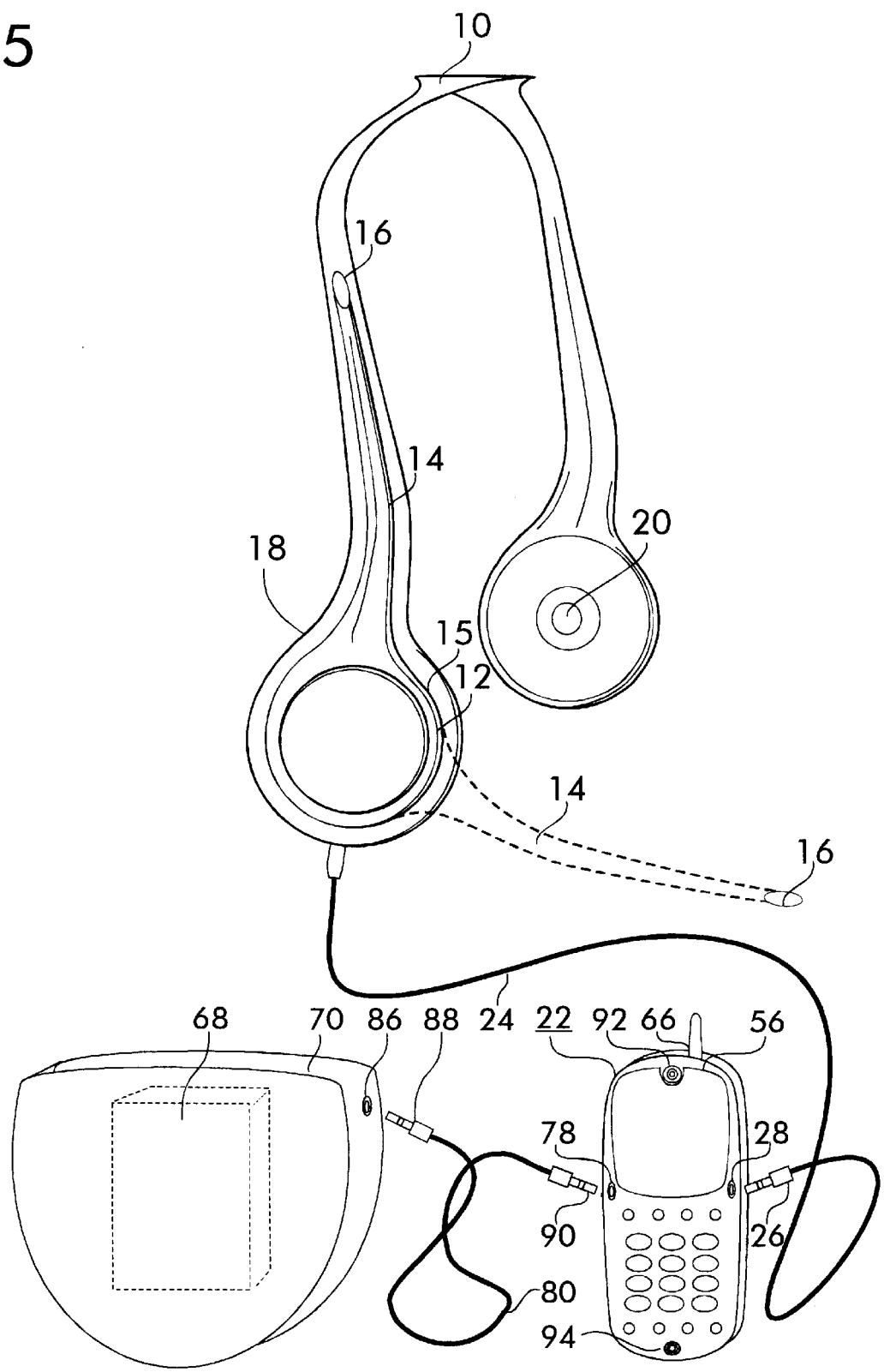
FIG. 5 shows a perspective view of the second embodiment of the personal portable communication and audio system.

FIG. 5 shows an alternative embodiment of the invention. The digital cellular telephone is in main housing 22 and the digital audio device is in a separate housing 70. The digital cellular telephone can be used individually without the headset 10 or the audio device 68. Having separate housings and power sources makes it possible to use either device individually. When the headset is connected to the jack 28 and the audio device 68 is employed, the digital cellular telephone and audio device operates the same way as in the first embodiment and the system can be operated through a common headset.

Figure 6:
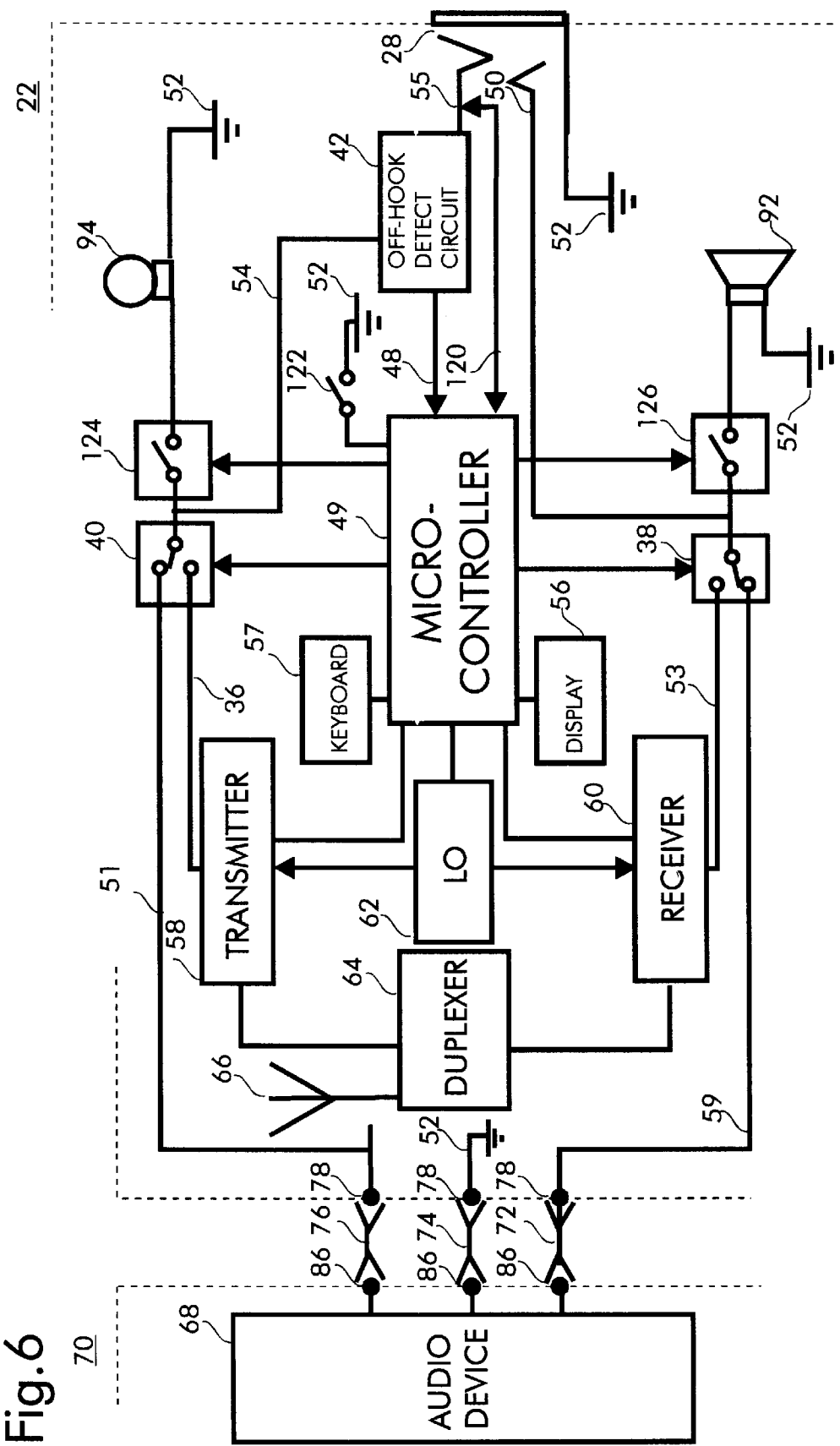
FIG. 6 shows a block diagram of the second embodiment.

FIG. 6 shows a block diagram of the second embodiment of my invention. Referring to FIGS. 5 and 6, the audio device 68 is connected to the housing 22 by a cord 80. In the first end of the cord 80 there is a connector 88 mating to a jack 86 in the housing 70 and in the second end a connector 90 mating to the jack 78 in the housing 22. The cord 80 has three conductors 72, 74, and 76. Conductor 76 connects the first audio channel of the audio device 68 through jack 86 to conductor 51 leading to the controllable switch 40. The conductor 72 connects the second audio channel of the audio device 68 to the conductor 54 leading to the controllable switch 38. Conductor 74 leads to the ground 52.

When a user uses the digital cellular telephone with headset 10, controllable switches 96 and 98 are connected to conductors 50 and 54 respectively leading to the headset 10 through the jack 28.

The jack 28 of this embodiment has an extra set of normally closed contacts. This special type of phone jack is readily available. When a headset connector 26 (FIG. 5) is inserted, the tip of the headset connector 26 bears against the usual contact leaf, making contact with the leaf and bending it slightly, thereby opening the extra contact points. The open-versus-closed state of extra contacts is detected to provide a control input to the system. The phone jack 28 has an extra contact leaf to which line 120 in connected. When the headset is not plugged in, line 55 connects to the microcontroller input line 120 through the normally closed contacts of jack 28, transferring the voltage Vmic from headset detect circuit 42 (FIG. 2), to the microcontroller input line 120. The control program for the microcontroller 49 is written to recognize the presence of voltage at line 120 and respond by setting the state of the system in which the headset is switched into the system. The microcontroller 49 switches the handset microphone 94 and handset speaker 92 into the system by closing switches 124 and 126 respectively. The microcontroller 49 activates the handset off-hook switch 122 by logically enabling the input from switch 122. Conversely, when the headset 10 (FIG. 5) is plugged in, the mentioned contacts at jack 28 are open, disconnecting the microcontroller input line 120 from the voltage source, Vmic, from headset detect circuit 42 (FIG. 2). The control program for the microcontroller 49 is written to recognize the absence of voltage at line 120 and respond by setting the state of the system in which the HANDSET is switched out of the system. The microcontroller 49 disconnects the handset microphone 94 and handset speaker 92 by opening switches 124 and 126 respectively. The microcontroller 49 disables the handset off-hook switch 122 by logically disabling the input from switch 122.

Preferably, disconnecting the headset from the radio telephone automatically provides a headset-to-handset switchover signal sent to the microcontroller. Alternatively, for instance, a headset-to-handset switchover signal can be provided in response to a user depressing a dedicated switch button (not shown) or providing a predetermined input to the radio telephone keypad.

OPERATION OF THE SECOND EMBODIMENT

A user can use the digital cellular telephone individually without the audio device 68 by disconnecting the connector 90 (FIG. 5) of the cord 80 from the jack 78. When audio device 68 is not connected, no audio broadcast program or stored digital audio program is heard.

When headset 10 is connected and telephone is in standby mode, a user can hear telephone ring alert signals through the headset speaker 18. The user-manipulated switch is connected to the pivot 15 of the boom 14 (FIG. 5). When ring alert signal is heard through the speaker 18, the user can initiate a phone call by turning the switch 12 in front of the mouth to the microphone 16 position. The off-hook detector 42 senses the voltage or current change on line 55 and sends information to the microcontroller 49. Microcontroller 49 switches controllable switch 38 to receive telephone audio speech signal from receiver 60 through conductor 53 and forwards it to headset speaker 18 through conductor 50. Simultaneously microcontroller 49 also switches controllable switch 40 to receive telephone audio speech signal from the microphone 16 through the conductors 54 and 55 and forward it to the transmitter 58 through conductor 36.

Headset 10 can alternatively be used to listen to an audio broadcast program or stored digital audio program from the audio device 68 by connecting the headset 10 connector 26 to the jack 86 in audio device housing 70. When the switch 12 in the headset 10 is in the speaker 20 position user can listen audio program through both speakers 18 and 20.

When the connector 26 of the headset 10 is not connected to the jack 28, the microcontroller 49 adjusts telephone ring alert signal alert level so high that it can easily heard from a pocket or a bag where the telephone is usually held. Ring alert signal is heard through handset speaker 92. User answers the telephone call by pushing the switch 122. In the end of the call user sends an on-hook message by pushing the same button. Without the audio device and headset, the telephone can be used individually so as to perform telephone operations.

THIRD EMBODIMENT

Figure 7:
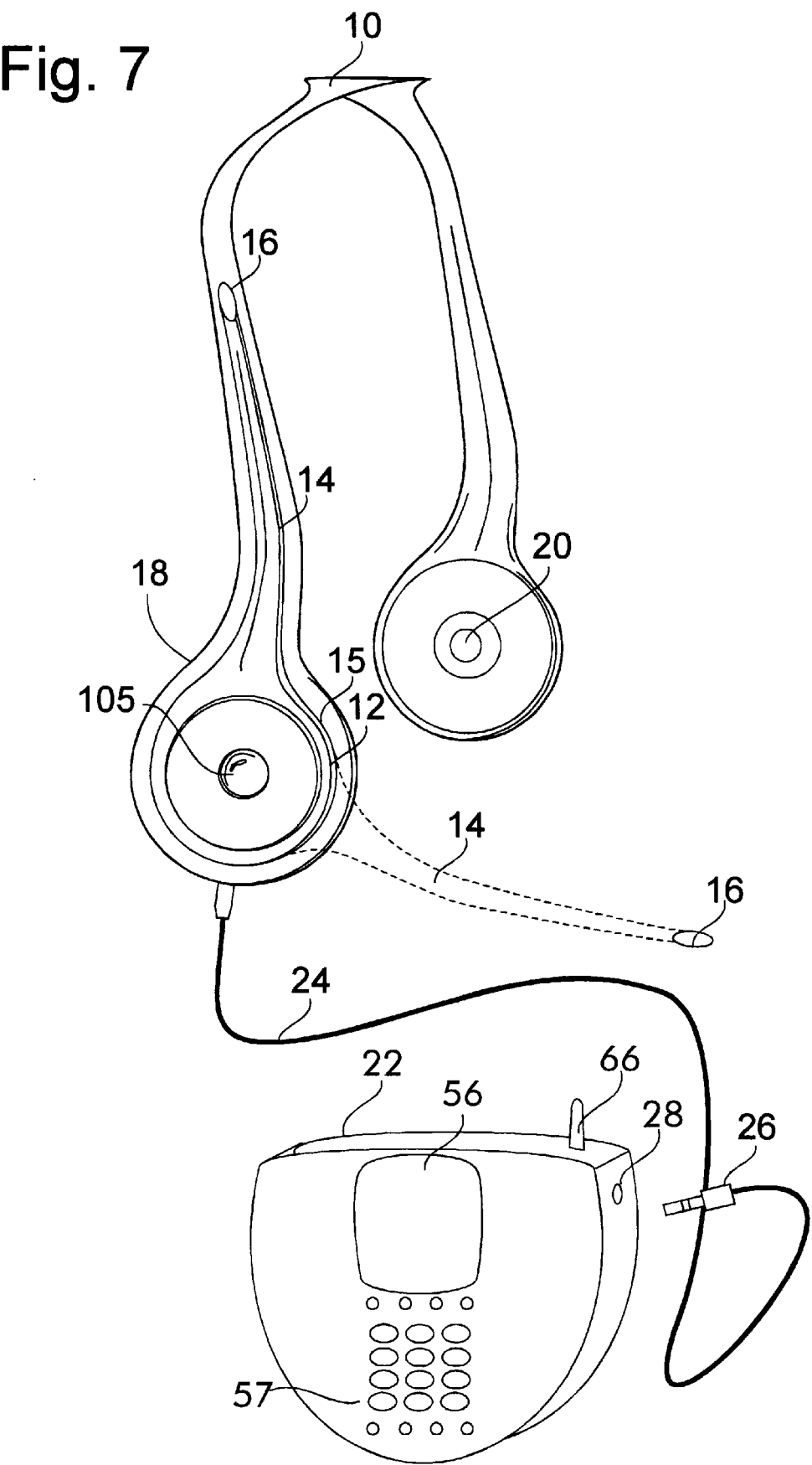
FIG. 7 shows a perspective view of the third embodiment of the personal portable communication and audio device.

FIG. 7 shows a perspective view of the third embodiment of the personal portable communication and audio device. The headset contains a momentary switch 105 located conveniently in the headset near a user's ear where it is easily available. User-manipulated switch 12 is connected to the pivot 15 of the boom 14.

Figure 8:
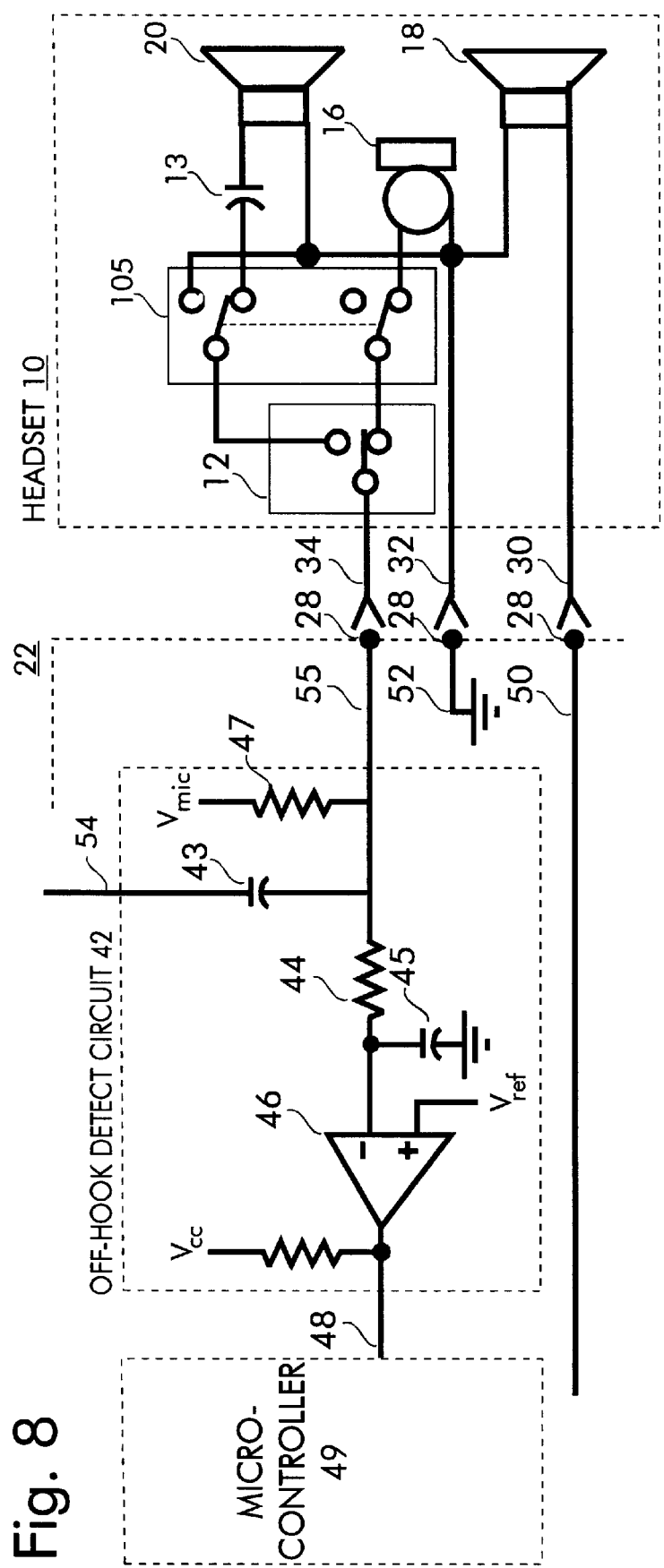
FIG. 8 shows a circuit diagram of the headset of the third embodiment.

FIG. 8 shows the headset circuit of the third embodiment and the connections to offhook detect circuit 42 and microcontroller 49. The momentary switch 105 is a Double-Pole-Double-Throw (DPDT) type of switch. When switch 12 is in the speaker 20 position, momentary activation of switch 105 causes the voltage at line 55 to go from high to low (actually zero). When switch 12 is in the microphone 16 position, momentary activation of switch 105 causes the voltage at line 55 to go from low to high. The microcontroller 49 has the state of switch 12 in its memory from the previous history of events leading up to the momentary activation of switch 105, so that the change in voltage at line 55, from high to low in speaker 20 position or from low to high in microphone 16 position, can be properly interpreted by the stored program. When the switch 105 is pressed the microcontroller sends a different key activation signal, depending upon which position switch 12 is in. Key activation signal is heard through the speaker 18.

The momentary switch 105 is located after the switch 12. The location in series with the microphone 16, or alternatively with capacitor 13 and speaker 20, enables microcontroller 49 to output a brief tone to the speaker 18 each time the button is pressed. This way the user is given an indication that the push-button has been pressed. User can cause the audio device and telephone to perform multiple functions by pressing the momentary switch 105 in different predetermined patterns.

Microcontroller 49 has in its memory both the switch 12 position and the current operative mode, i.e. what function the digital cellular telephone and audio device is currently performing, such as CD listening or telephone ring alert receiving. Microcontroller 49 then recognizes the push pattern and compares it to this stored information. Based upon this comparison it then performs the requested function.

Figure 9:
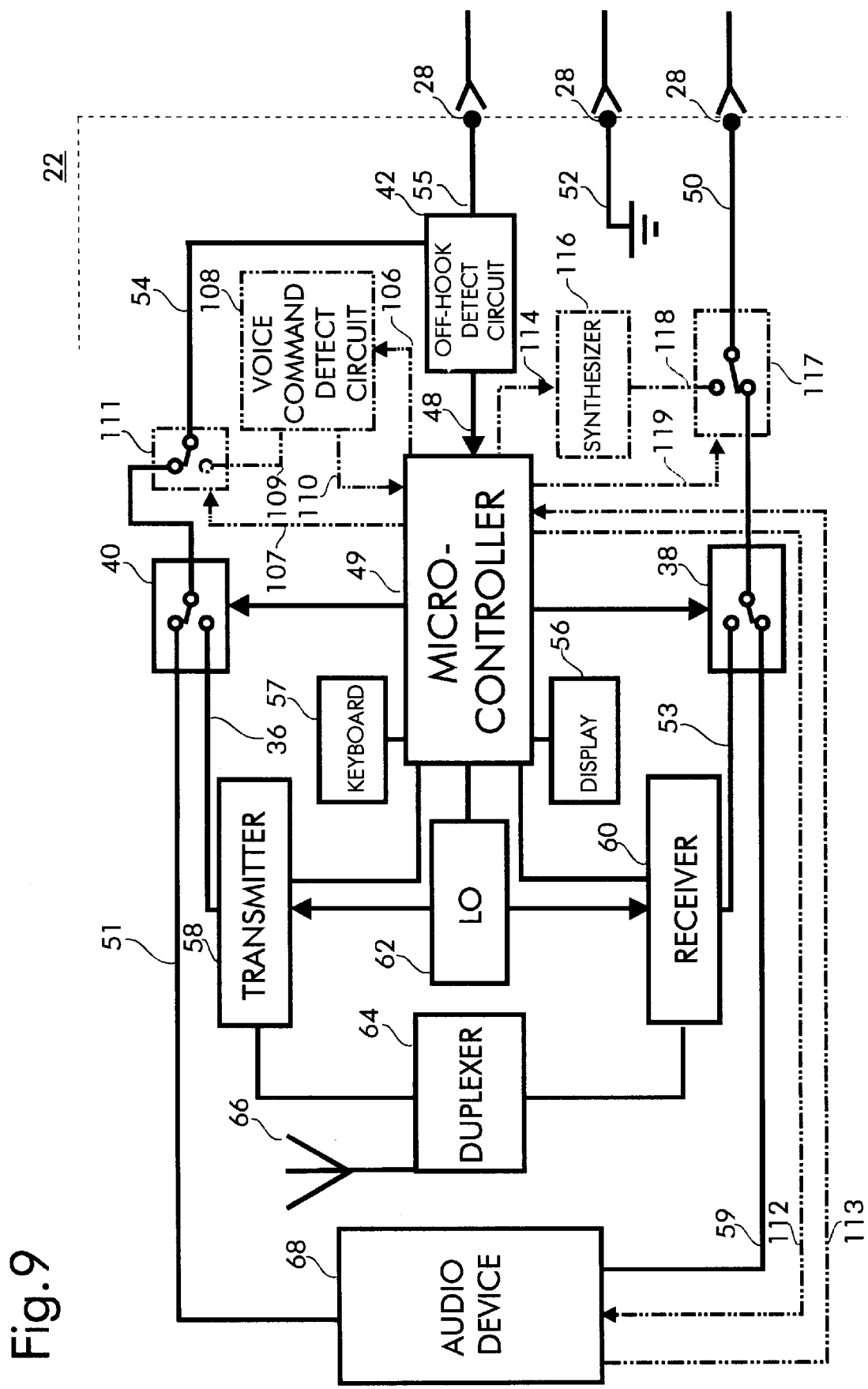
FIG. 9 shows a block diagram of one version of the third embodiment.

FIG. 9 shows a block diagram of one version of the third embodiment. Parts shown in solid-line form are similar to the like-numbered parts of FIG. 3 (first embodiment) and operate in the same manner. Parts shown in phantom line represent modifications to the FIG. 3 circuit to realize this version of the third embodiment.

In FIG. 3, the off-hook detect circuit 42 merely passes on to the microcontroller 49, the momentary off-hook states, where they are decoded in software to initiate the so-called flash-hook functions such as call transfer and conference call or different audio device functions such as scan radio stations, stop scanning, or recorded program functions like replay, skip, random play. Using well-known programming concepts of timing (delay) loops with decision and branch-to-subroutine statements, it is easy to set up microcontroller 49 to decode various inputs differentiated only by the number of rapidly repeated switch closures, or by the time the switch is kept open on a common input line. No modifications to headset detect circuit 42 are required, provided the time constant of resistor 44 and capacitor 45 (FIG. 8) is not so long that the comparator 46 cannot respond fast enough to separate successive off-hook states that are closely spaced in time. An exemplary time constant of 3 ms is recommended for resistor 44 and capacitor 45 to balance the somewhat conflicting requirements of smoothing the input voltage to the comparator while enabling the comparator to respond quickly enough to catch the individual off-hook states.

Microcontroller 49 of this embodiment also controls the audio device 68 through conductor 112. In addition to standard microcontroller operated on-off or squelch-during-call operations, microcontroller performs user-operated audio device functions such as scan, stop scan, skip and repeat.

This embodiment has a synthesizer 116 between the microcontroller 49 the line 50. The synthesizer 116 is able to convert digital alphanumeric information to audio speech signal. The synthesizer 116 is connected to microcontroller 49 through input line 1 14 and it has an output line to speaker 18 through a microcontroller controllable switch 117. Additional information such as radiotext providing, e.g., performer information, program service name, name of performer, track number etc., is routed from the audio device 68 to microcontroller 49 over the line 113. Instead of showing the information on display 56, radiotext is routed through the synthesizer 116 to the speaker 18 where it is heard in desired way, for example every time when the message changes. Digital alpha-numeric information for processing by the synthesizer can be originated from broadcast radio program, stored media like CD or tape (e.g., track information, track number or title), or it can be part of the telephone in-house service such as pager messages.

The third embodiment has an additional voice command detection circuit 108. User is able to give voice commands through the microphone 16. He/she turns the microphone in front of the mouth ("mouth position") which connects the microphone 16 on line 54. User performs a predetermined momentary switch-pattern, like pushing the momentary switch for, say, 2 seconds. The give-voice-command pattern is recognized by microcontroller 49. After such recognition, microcontroller 49 gives user a tone through speaker 18 to start speaking to the microphone. Simultaneously microcontroller 49 turns the switch 111 to voice command detect circuit 108 position. Microcontroller 49 gives user a predetermined time to give a command. If he/she fails to give the command in this time, microcontroller 49 gives an audible error tone through speaker 18 and returns to idle mode. Tone is a message to user to try again. Successfully given voice command is routed to a voice command detect circuit 108 through line 54 and the switch 111. Voice command detect circuit compares given command to sample commands stored in its memory. When command is recognized the voice command detect circuit issues an associated acknowledgment signal over line 110 to microprocessor 49. If signal is acceptable microprocessor 49 performs the function; if command is not correct, feedback in order to try new recognition is given for detect circuit over line 106. If given command is deemed to be unrecognizable after predetermined recognition rounds, user is given an error tone through the speaker 18. Error tone is a message for user to give a command again. If new command is not given in predetermined time, microcontroller 49 returns to idle mode.

OPERATION OF THE THIRD EMBODIMENT

In FIG. 7 the user-manipulated switch 12 is connected to work with the boom 14 and the pivot 15. Boom 14 is pivotally connected to the headset 10. When the boom 14 is in its upward position, user manipulated switch 12 is connected to the speaker 20. When the boom 14 is in front ("mouth") position, the user-manipulated switch 12 is connected to the microphone 16.

Additionally, the headset 10 has a momentary switch 105 which can produce flash-hook functions, i.e. rapidly repeated switch closures, such as click, double click, triple click and push. Clicks mean pushing the switch rapidly. This makes a short disconnection of the momentary switch 105. Double and triple clicks are examples of multiple clicks. Push is a continuous, predetermined length of time during which switch is open.

With flash-hook operations, switch 12 being connected to microphone 16, user can perform telephone operations, for example forward telephone calls, perform conference call, call waiting and instant call back. By clicking the momentary switch 105 when pager message, or E-mail ring alert signal is heard (pager message receiving mode), user can listen to the message through the synthesizer. In audio-listening mode, with switch 12 being connected to the speaker 20, a user can, for example, adjust volume, scan radio stations and stop scanning.

In case pager alarm ring signal is heard, the microcontroller 49 alarms the user with audible sound which is heard through the speaker 18. If user responds by clicking switch 105 in a predetermined way, the microcontroller 49 sends a message to the synthesizer 116 [[[[and connects switch 117 to synthesizer]]]]The synthesizer 116 converts the information to audio sound signal and sends such signal to the speaker 18 where it is converted to audible sound and heard. User can also get information automatically if desired, through radiotext, e.g., hear the performer's name through the synthesizer without hearing alarm tone and pushing the button 105. With the telephone being in ring alert signal receiving mode, standard caller ID information can be converted to audible sound by using the synthesizer 116. Caller's number, or in case the caller's name is in telephone's memory, name will be announced through speaker 18. An announcement such as "MOM CALLING" can be heard.

When message is listened to through the synthesizer 116, the microcontroller 49 squelches audio signals from the audio device 68 by using controllable switches 38 and 40. By using the synthesizer 116 user is able to listen to alpha numeric messages in audible form without taking the headset off the head. This is convenient when it is not possible to read the message on the handset display 56.

Examples of synthesized messages are:
Radio Broadcast information: "WPLJ" or "95.5" or "HOWARD STERN" or "PERFORMER: K D LANG."
Telephone messages: "ANDY CALLING" or "212 7279163 CALLING."
Stored program messages: "TRACK 14" or "TRACK 14, PLAYING: TOM'S DINER."

The third embodiment also employs a voice command detect circuit 108. Voice commands consist of a plurality of partial commands, such as digits of numbers given by the user.

In order to give voice commands user turns the boom 14 in front, or mouth, position, pushes the momentary switch 105 in a predetermined way, say for example, 2 seconds. The microcontroller 49 recognizes the pattern of switch closures, and compares it to operational mode and enables voice command operation. User hears a microcontroller ready tone through the speaker and then speaks to the microphone 16 within predetermined time period. Voice command detection circuit 108 is able to recognize voice commands by comparing the given command to the sample commands stored in its memory. After recognition of the command the voice command detect circuit 108 gives an associated signal to microcontroller 49 over the conductor 110. Microcontroller 49 receives the command, compares it to the current operative mode and performs the requested function.

Voice commands are used to control digital cellular telephone and CD, radio, tape and other audio device operations as well as the program and re-program them. Examples of commands for telephone are: the voice command click pattern+"CALL TOM" or "CALL 212 989 1915." Example commands for radio are: the voice command click pattern+ "95.5 WPLJ", or "AM" or "FM". Programming can be started by giving command "PROGRAM". Program features are used to save, remove, and change voice command sample information in a memory.

Figure 10:
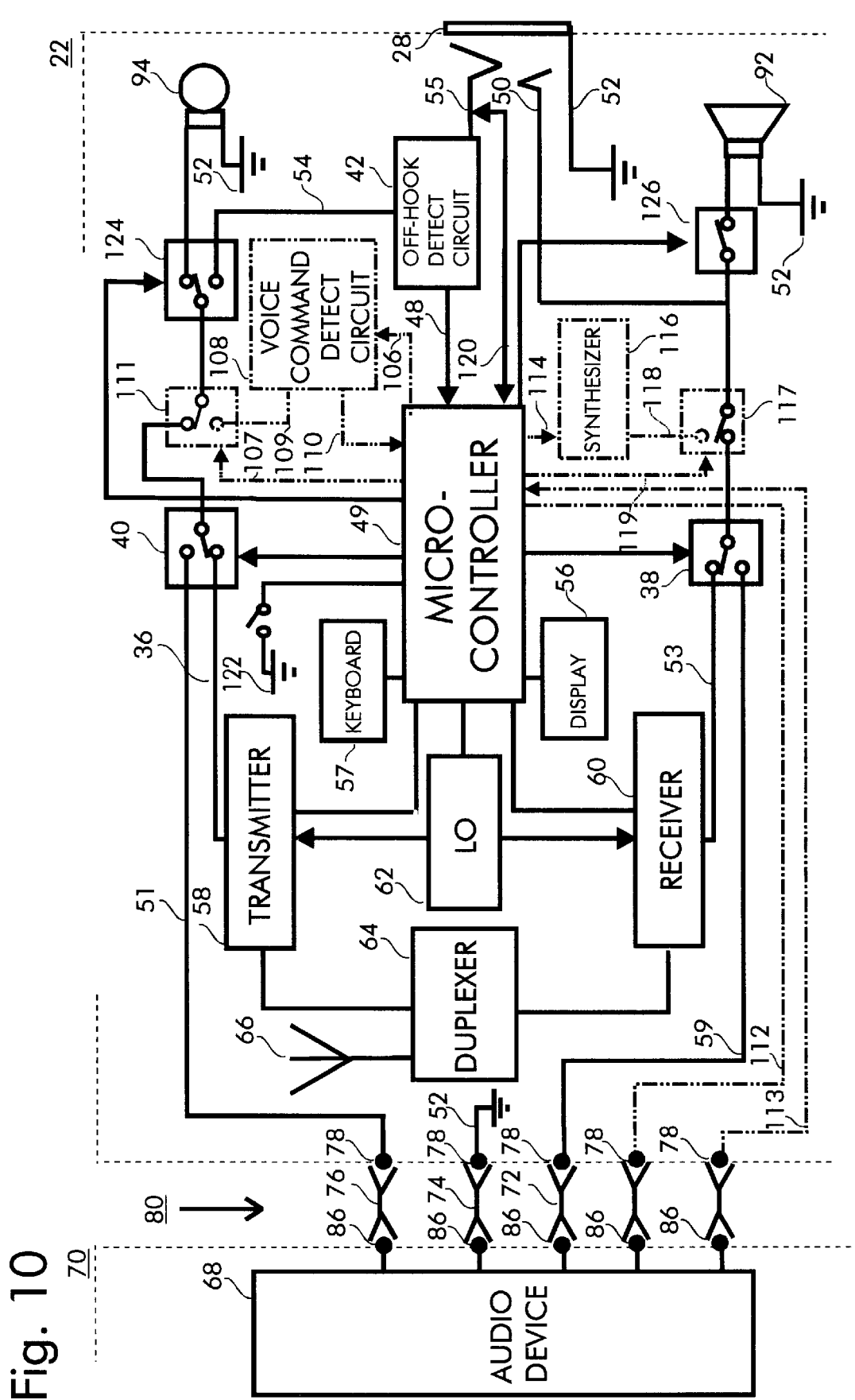
FIG. 10 shows a block diagram of another version of the third embodiment.

FIG. 10 shows a block diagram of another version of the third embodiment. Parts shown in solid-line form are similar to the like-numbered parts of FIG. 6 (second embodiment) and operate in the same manner. Parts shown in phantom line represent modifications to the FIG. 6 circuit to realize this version of the third embodiment.

In FIG. 10, the parts shown in phantom lines operate in the same manner as just described in connection with FIG. 9.

RAMIFICATIONS

Several digital cellular systems are in use. Second-generation time-division multiple access (TDMA) and code-division multiple access (CDMA) digital systems provide digital speech and short message services. Third generation will provide universal personal communication system (UPCS). International Telecommunications Union (ITU) is developing standards which will support FPLMTS (future public land mobile telecommunications system) and UMTS (universal Mobile telecommunications system). These all, but especially broadband B-CDMA, is especially suitable to be adapted for use as cellular phone/broadcast receiver, because it allows operation in several frequencies.

Since different digital telephone and radio techniques can be employed, all having physically different features, it is obvious that all of them can be used as part of the digital cellular telephone and audio system of the invention.

Since digital cellular telephone service is not restricted to a terrestrial station, it is possible to employ a telephone unit and broadcast radio receiver which is designed to communicate through a satellite. Satellite-based communication use the same protocols as terrestrial or protocols being compatible with and supporting them. Satellite is capable to transmit and receive multiple telephone communications simultaneously with multiple transmitters and receivers. Satellite is also used to transmit digital audio broadcasting (DAB).

Preferably employed broadcast radio receiver should be a receiver capable to receive digital audio broadcasting DAB. DAB is able to correct transmission errors. It provides noiseless sound without interference on low power. Preferably broadcast program should be listened to through an audio device which is able to receive program on variable bandwidth. In further embodiments, it can also possible be to receive program through digital cellular telephone receiver. TDMA networks and networks using CDMA technology can carry several programs using same frequency. This extra network capacity makes it possible to employ one of those programs to carry digital audio broadcasting. DAB receiver also has an opportunity for value added services similar to RDS.

DAB transmitter network works in considerably lower energy level than conventional AM/FM networks and are more environment friendly. Low receiver power consumption also saves energy and provides also longer operating time. In a case where DAB program is sent through telephone network separate audio device for to receive digital audio broadcast is not needed, since digital cellular telephone and DAB can use same receiver. In further embodiments DAB program can be user responsive. User can send messages to radio station since the phone has a transmitter. This is practical when, for example, a listener's opinion is asked. This makes it also possible to employ payradio technology. In payradio an user can order certain programs and listen to it when desired.

Radio data systems (RDS) has been in used in Europe and Radio Broadcast data service RBDS standards have passed U.S. National Radio Systems Committee in 1993. RDS is a further development of VHF FM broadcasting. RDS uses free space in stereo multiplex signal. RDS can be used to carry tuning aids, switching signals, radiotext, news and various other information services, such as program identification and program type which allows user to scan stations. User can also get messages about traffic emergency announcements. Music/speech identification sets tone and volume control on individual level. Program item number automatically switches to desired program. Radiotext identifies music, name of performer, change of program etc. either by display or through speech synthesizer. RDS and digital radio can offer house applications like radio paging, switching signals and audio monitoring data Digital satellite radio DSR provides also stereo programs in CD quality.

Compact disc player should play digitally encoded audio which is read by a laser beam. It can be in compact disc form which was developed By Phillips and Sony and widely accepted as standard for industry after the release in 1982.

Disc can be smaller like the Mini disc which was launched in Japan in 1992 or similar type smaller disc. Disc have a plastic cartridge protecting the recording. MD is also resistant to impacts which might cause skipping in reading.

Digital compact cassette (DCC) was developed with Phillips and Matsushita and introduced in 1992. This cassette will be partially compatible with old C-cassette. This means that new DCC players reading head has tracks to read digital recordings and additional tracks to listen to analog cassettes.

Magneto-optical disks (MOD) is especially developed for audio recordings. This technique makes it possible to re-record discs if desired. In re-recording previously recorded data can be directly overwritten by magnetic field modulation. Playing time without data reduction can be four-folded by using MSC (multiadaptive spectral audio coding) developed by Thompson.

Digital audio tape (DAT) have superior qualities over DCC. DAT uses digital magnetic tape recording method. Rotary head R-DAT have 2–3 hour playing time with less tape than C-cassette or DCC. It is faster to search and smaller than CC or DCC. It is also has additional date capacity for further applications. When recordability is needed in small form DAD will eventually replace other forms and is also part of the preferred embodiment of this invention. Since R-DAT cassette is smaller than conventional compact cassette, compact drive mechanism and fast search, it is ideal for portable devices.

The user-manipulated switch should preferably be located near the user's ear, where it is easily accessible. In embodiment which employs earplug-style speakers user-manipulated switch can be placed in the cord to bring a microphone near user's mouth.

Separate housings should preferably be connected with a cord. Alternatively, instead of having a cord, housings can be connected by a sliding connector or snap-in type closing locking housings together and connecting the conductors.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A portable communication and audio system comprising:
   (a) a radio telephone for receiving a first audio signal and transmitting a corresponding first radio signal through a transmitter to another location and for receiving a second radio signal through a receiver and converting it to a second audio signal;
   (b) an audio device providing a third stereophonic audio signal;
   (c) a microphone receptive of said first audio signal and being enabled through a conductive path that includes a link for said microphone;
   (d) a headset with first and second speakers for selectively listening to said second audio signal through said second speaker when conduction through said link for said microphone is enabled, or said third stereophonic audio signal through said first and second speakers when a required conductive link for said second speaker is enabled;
   (e) a user-operated switch having at least two states including a first state for enabling conduction through said conductive link for said second speaker and a second state for enabling conduction through said link for said microphone;
   (f) a state-indicating means for detecting the state of said user-operated switch; and
   (g) a control means, responsive to said state-indicating means for connecting said first and second speakers to receive said third stereophonic audio signal when said user-operated switch is in said first state, and for enabling telephone usage by connecting said microphone to said transmitter and connecting said second speaker to said receiver when said user-operated switch is in said second state.

2. The system of claim 1, further comprising a pivotable boom depending from said headset; said microphone being located on said boom; said boom having a mouth position when said microphone is located to receive said first audio signal from a user's mouth and an off-mouth position when said microphone is located elsewhere; a user adjusting position of said boom for manipulating said user-operated switch.

3. The system of claim 1, wherein said state-indicating means comprises detection means to automatically detect a voltage or current change associated with a change of states of said user-operated switch.

4. The system of claim 3, wherein said state-indicating means includes a frequency-dependent impedance coupled to said first speaker for enabling the coupled combination of said first speaker and impedance to have a discernibly different impedance than said microphone at a predetermined frequency, so as to facilitate operation of said detection means.

5. The system of claim 4, wherein said frequency-dependent impedance comprises a capacitor in series with said first speaker.

6. The system of claim 1, wherein said radio telephone is a cellular telephones.

7. The system of claim 1, wherein said radio telephone is a digital cellular telephone.

8. The system of claim 1, wherein said audio device is a digital radio capable of receiving digital audio broadcasting and converting it to said third audio signal.

9. The system of claim 1, further comprising a synthesizer for receiving a signal representing alpha-numeric information from said radio telephone or said audio device and converting said signal to an audible sound signal.

10. The system of claim 9, wherein:
(a) said audio device is a radio having a signal with radiotexts; and
(b) said alpha-numeric information comprises said radiotexts.

11. The system of claim 8, wherein said audio device is a digital satellite broadcast receiver.

12. The system of claim 1, wherein said audio device is an information storage device.

13. The system of claim 1, wherein said radio telephone and said audio device both share said receiver of said radio telephone for producing said second and third audio signals.

14. The system of claim 1, wherein said microphone is located in a cord between said headset and said radio telephone.

15. The system of claim 1, wherein said user operated switch is located in a cord between said headset and said radio telephone.

16. The system of claim 9, wherein:
(a) said audio device is an information storage device having a signal with radiotexts; and
(b) said alpha-numeric information comprises said radiotexts.

17. The system of claim 1, further providing automatic telephone answering while listening to an audio signal from said audio device through said second speaker when said user-operated switch is in said second state, wherein said control means includes means for automatically squelching said last-mentioned audio signal and initiating a telephone call when a telephone ring alert signal occurs.

18. The system of claim 17, further comprising means for routing a telephone ring signal through said second speaker to alert user of an incoming call before automatically answering the telephone call.

19. The system of claim 1, wherein said control means operates to selectively enable telephone usage or to connect said first and second speakers to receive said third audio signal independently of any control signal from said audio device.

20. A portable communication and audio system comprising:
(a) a radio telephone for receiving a first audio signal and transmitting a corresponding first radio signal through a transmitter to another location and for receiving a second radio signal through a receiver and converting it to a second audio signal; said radio telephone including;
  (i) a handset microphone;
  (ii) a handset speaker;
  (iii) an input means for connection to an audio device for providing a third stereophonic audio signal; and
  (iv) an input means for connection to a headset;
(b) an audio device providing a third stereophonic audio signal:
(c) a microphone receptive of said first audio signal and being enabled through a conductive path that includes a link for said microphone
(d) a headset with first and second speakers for selectively listening to said second audio signal through said second speaker when conduction through said link for said microphone is enabled or said third stereophonic audio signal through said first and second speakers when a required conductive link for said second speaker is enabled;
(e) a user-operated switch operative when said headset is connected to said radio telephone and having at least two states including a first state for enabling conduction through said conductive link for said second sneaker and a second state for enabling conduction through said link for said microphone;
(f) a state-indicating means operative when said headset is connected to said radiontelephone for detecting the state of said user-operated switch;
(g) a control means, responsive to said state-indicating means and operative when said headset is connected to said radio telephone, for connecting said first and second speakers to receive said third stereophonic audio signal when said user-operated switch is in said first state, and for enabling telephone usage by connecting said microphone to said transmitter and connecting said second speaker to said receiver when said user-operated switch is in said second state: and
(h) a handset control means for connecting said handset microphone to said transmitter and said transmitter and said handset speaker to said receiver in response to a headset-to-handset switchover signal.

21. The system of claim 20, further comprising a pivotable boom depending from said headset; said microphone being located on said boom; said boom having a mouth position when said microphone is located to receive said first audio signal from a user's mouth and an off-mouth position when said microphone is located elsewhere; a user adjusting position of said boom for manipulating said user-operated switch.

22. The system of claim 20, wherein said state-indicating means comprises detection means to automatically detect a voltage or current change associated with a change of states of said user-operated switch.

23. The system of claim 22, wherein said state-indicating means includes a frequency-dependent impedance coupled to said first speaker for enabling the coupled combination of said first speaker and impedance to have a discernibly different impedance than said microphone at a predetermined frequency, so as to facilitate operation of said detection means.

24. The system of claim 23, wherein said frequency-dependent impedance comprises a capacitor in series with said first speaker.

25. The system of claim 20, wherein said radio telephone is a cellular telephone.

26. The system of claim 20, wherein said radio telephone is a digital cellular telephone.

27. The system of claim 20, wherein said audio device is a digital radio capable of receiving digital audio broadcasting and converting it to said third audio signal.

28. The system of claim 20, further comprising a synthesizer for receiving a signal representing alpha-numeric information from said radio telephone or said audio device and converting said signal to an audible sound signal.

29. The system of claim 28, wherein:
 (a) said audio device is a radio having a signal with radiotexts; and
 (b) said alpha-numeric information comprises said radiotexts.

30. The system of claim 20, further comprising means for generating said headset-to-handset switchover signal automatically when said headset is disconnected from said radio telephone.

31. The system of claim 27, wherein said audio device is a digital satellite broadcast receiver.

32. The system of claim 20, wherein said audio device is a information storage device.

33. The system of claim 20, wherein said microphone is located in a cord between said headset and said radio telephone.

34. The system of claim 20, wherein said user operated switch is located in a cord between said headset and said radio telephone.

35. The system of claim 28, wherein:
 (a) said audio device is a information storage device having a signal with radiotexts; and
 (b) said alpha-numeric information comprises said radiotexts.

36. The system of claim 28, further providing automatic telephone answering while listening to an audio signal from said audio device through said second speaker when said user-operated switch is in said second state, wherein said control means includes means for automatically squelching said last-mentioned audio signal and initiating a telephone call when a telephone ring alert signal occurs.

37. The system of claim 36, further comprising means for routing a telephone ring signal through said second speaker to alert user of an incoming call before automatically answering the telephone call.

38. A portable communication and audio system comprising:
 (a) a radio telephone for receiving a first audio signal and transmitting a corresponding first radio signal through a transmitter to another location and for receiving a second radio signal through a receiver and converting it to a second audio signal;
 (b) an audio device providing a third stereophonic audio signal;
 (c) a microphone receptive of said first audio signal and being enabled through a conductive path that includes a link for said microphone;
 (d) a headset with first and second speakers for selectively listening to said second audio signal through said second speaker when conduction through said link for said microphone is enabled or said third stereophonic audio signal through said first and second speakers when a required conductive link for said second speaker is enabled;
 (e) a user-operated switch having at least two states including a first state for enabling conduction through said conductive link for said second speaker and a second state for enabling conduction through said link for said microphone;
 (f) a state-indicating means for detecting the state of said user-operated switch; and
 (g) a control means, responsive to said state-indicating means, for connecting said first and second speakers to receive said third stereophonic audio signal when said user-operated switch is in said first state, and for enabling telephone usage by connecting said microphone to said transmitter and connecting said second speaker to said receiver when said user-operated switch is in said second state;
 (h) a user-operated momentary switch; and
 (i) a second control means, responsive to the state of said momentary switch, for implementing a control function for a selected one of at least said radio telephone and said audio device; said control means outputting a tone to a speaker each time the momentary switch is activated.

39. The system of claim 41, wherein said second control means provides different control functions depending on a pattern of a plurality of sequential activations of said momentary switch each for a duration of at least a predetermined period of time.

40. The system of claim 39, wherein said pattern differentiates between activation of said momentary second switch below, and at least as long as, a second predetermined period of time.

41. The system of claim 38, wherein said second control means is effective to implement respective control functions of said radio telephone or said audio device depending on the state of said first-mentioned user-operated switch and the current operating mode of said radio telephone or said audio device.

42. The system of claim 38, further comprising a pivotable boom depending from said headset; said microphone being located on said boom; said boom having a mouth position when said microphone is located to receive said first audio signal from a user's mouth and an off-mouth position when said microphone is located elsewhere; a user adjusting position of said boom for manipulating said user-operated switch.

43. The system of claim 38, wherein said state-indicating means comprises detection means to automatically detect a voltage or current change associated with a change of states of said user-operated switch.

44. The system of claim 43, wherein said state-indicating means includes a frequency-dependent impedance coupled to said first speaker for enabling the coupled combination of said first speaker and impedance to have a discernibly different impedance than said microphone at a predetermined frequency, so as to facilitate operation of said detection means.

45. The system of claim 44, wherein said frequency-dependent impedance comprises a capacitor in series with said first speaker.

46. The system of claim 38, wherein said radio telephone is a cellular telephone.

47. The system of claim 38, wherein said radio telephone is a digital cellular telephone.

48. The system of claim 38, wherein said audio device is a digital radio capable of receiving digital audio broadcasting and converting it to said third audio signal.

49. The system of claim 38, further comprising a synthesizer for receiving a signal representing alpha-numeric information from said radio telephone or said audio device and converting said signal to an audible sound signal.

50. The system of claim 49, wherein:
(a) said audio device is a radio having a signal with radiotexts; and
(b) said alpha-numeric information comprises said radiotexts.

51. The system of claim 38, further comprising:
(a) a voice command detect circuit coupled to said microphone for receiving spoken commands from a user for a selectable one of said radio telephone and said audio device; and
(b) means, responsive to said voice command detect circuit, for recognizing a plurality of said spoken commands and responding by carrying out respective, corresponding commands stored in memory.

52. The system of claim 48, wherein said audio device is a digital satellite broadcast receiver.

53. The system of claim 38, wherein said audio device is a information storage device.

54. The system of claim 38, wherein said radio telephone and said audio device both share said receiver of said radio telephone for producing said second and third audio signals.

55. The system of claim 38, wherein said microphone is located in a cord between said headset and said radio telephone.

56. The system of claim 38, wherein said user operated switch is located in a cord between said headset and said radio telephone.

57. The system of claim 49, wherein:
(a) said audio device is a information storage device having a signal with radiotexts; and
(b) said alpha-numeric information comprises said radiotexts.

58. The system of claim 38, further providing automatic telephone answering while listening to an audio signal from said audio device through said second speaker when said user-operated switch is in said second state, wherein said control means includes means for automatically squelching said last-mentioned audio signal and initiating a telephone call when a telephone ring alert signal occurs.

59. The system of claim 58, further comprising means for routing a telephone ring signal through said second speaker to alert user of an incoming call before automatically answering the telephone call.

60. The system of claim 51, wherein the voice command is given by switching the user-operated switch to a microphone position, performing a pattern of one or more sequential activations of said momentary, user-operated momentary switch in a predetermined period of time to activate respective voice command program.

61. The system of claim 49, wherein the incoming alpha-numeric text can be listened in incoming message mode by performing a pattern of one or more sequential activations of said momentary, user-operated momentary switch in a predetermined period of time to activate respective voice command program.

62. A portable communication and audio system comprising:
(a) a radio telephone for receiving a first audio signal and transmitting a corresponding first radio signal through a transmitter to another location and for receiving a second radio signal through a receiver and converting it to a second audio signal; said radio telephone including;
  (i) a handset microphone;
  (ii) a handset speaker;
  (iii) an input means for connection to an audio device for providing a third stereophonic audio signal; and
  (iv) an input means for connection to a headset;
(b) an audio device providing a third stereophonic audio signal;
(c) a microphone receptive of said first audio signal and being enabled through a conductive path that includes a link for said microphone;
(d) a headset with first and second speakers for selectively listening to said second audio signal through said second speaker when conduction through said link for said microphone is enabled or said third stereophonic audio signal through said first and second speakers when a required conductive link for said second speaker is enabled;
(e) a user-operated switch operative when said headset is connected to said radio telephone and having at least two states including a first state for enabling conduction through said conductive link for said second speaker and a second state for enabling conduction through said link for said microphone;
(f) a state-indicating means for detecting the state of said user-operated switch;
(g) a control means, responsive to said state-indicating means, for connecting said first and second speakers to receive said third stereophonic audio signal when said user-operated switch is in said first state, and for enabling telephone usage by connecting said microphone to said transmitter and connecting said second speaker to said receiver when said user-operated switch is in said second state;
(h) a user-operated momentary switch;
(i) a second control means, responsive to the state of said momentary switch, for implementing a control function for a selected one of at least said radio telephone and said audio device; said control means outputting a tone to a speaker each time the momentary switch is activated: and
(j) a handset control means for connecting said handset microphone to said transmitter and said transmitter and said handset speaker to said receiver in response to a headset-to handset switchover signal.

63. The system of claim 62, wherein said second control means is effective to implement respective control functions of said radio telephone or said audio device depending on the state of said first-mentioned user-operated switch and the current operating mode of said radio telephone or said audio device.

64. The system of claim 65, wherein said second control means provides different control functions depending on a pattern of a plurality of sequential activations of said momentary switch each for a duration of at least a predetermined period of time.

65. The system of claim 63, wherein said pattern differentiates between activation of said second switch below, and at least as long as, a second predetermined period of time.

66. The system of claim 62, further comprising a pivotable boom depending from said headset; said microphone being located on said boom; said boom having a mouth position when said microphone is located to receive said first audio signal from a user's mouth and an off-mouth position when said microphone is located elsewhere; a user adjusting position of said boom for manipulating said user-operated switch.

67. The system of claim 62, wherein said state-indicating means comprises detection means to automatically detect a voltage or current change associated with a change of states of said user-operated switch.

68. The system of claim 67, wherein said state-indicating means includes a frequency-dependent impedance coupled to said first speaker for enabling the coupled combination of said first speaker and impedance to have a discernibly different impedance than said microphone at a predetermined frequency, so as to facilitate operation of said detection means.

69. The system of claim 68, wherein said frequency-dependent impedance comprises a capacitor in series with said first speaker.

70. The system of claim 62, wherein said radio telephone is a cellular telephone.

71. The system of claim 62, wherein said radio telephone is a digital cellular telephone.

72. The system of claim 62, wherein said audio device is a digital radio capable of receiving digital audio broadcasting and converting it to said third audio signal.

73. The system of claim 62, further comprising a synthesizer for receiving a signal representing alpha-numeric information from said radio telephone or said audio device and converting said signal to an audible sound signal.

74. The system of claim 73, wherein:
(a) said audio device is a radio having a signal with radiotexts; and
(b) said alpha-numeric information comprises said radiotexts.

75. The system of claim 62, further comprising:
(a) a voice command detect circuit coupled to said microphone for receiving spoken commands from a user for a selectable one of said radio telephone and said audio device; and
(b) means, responsive to said voice command detect circuit, for recognizing a plurality of said spoken commands and responding by carrying out respective, corresponding commands stored in memory.

76. The system of claim 62, wherein said audio device is a digital satellite broadcast receiver.

77. The system of claim 62, wherein said audio device is a information storage device.

78. The system of claim 62, wherein said microphone is located in a cord between said headset and said radio telephone.

79. The system of claim 62, wherein said user operated switch is located in a cord between said headset and said radio telephone.

80. The system of claim 73, wherein:
(a) said audio device is a information storage device having a signal with radiotexts; and
(b) said alpha-numeric information comprises said radiotexts.

81. The system of claim 62, further providing automatic telephone answering while listening to an audio signal from said audio device through said second speaker when said user-operated switch is in said second state, wherein said control means includes means for automatically squelching said last-mentioned audio signal and initiating a telephone call when a telephone ring alert signal occurs.

82. The system of claim 81, further comprising means for routing a telephone ring signal through said second speaker to alert user of an incoming call before automatically answering the telephone call.

83. The system of claim 62 further comprising means for generating said headset-to-handset switchover signal automatically when said headset is disconnected from said radio telephone.

84. The system of claim 62, wherein the voice command is given by switching the user-operated switch to a microphone position, performing a pattern of one or more sequential activations of said momentary, user-operated momentary switch in a predetermined period of time to activate respective voice command program.

85. The system of claim 73, wherein the incoming alpha-numeric text can be listened in incoming message mode by performing a pattern of one or more sequential activations of said momentary, user-operated momentary switch in a predetermined period of time to activate respective voice command program.

* * * * *